US008300823B2

(12) United States Patent
Bojinov et al.

(10) Patent No.: US 8,300,823 B2
(45) Date of Patent: Oct. 30, 2012

(54) ENCRYPTION AND COMPRESSION OF DATA FOR STORAGE

(75) Inventors: Hristo Bojinov, Sunnyvale, CA (US);
Yuval Frandzel, Sunnyvale, CA (US);
Robert Paul Wood, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 963 days.

(21) Appl. No.: 12/020,639

(22) Filed: Jan. 28, 2008

(65) Prior Publication Data
US 2009/0190760 A1    Jul. 30, 2009

(51) Int. Cl.
*H04K 1/00* (2006.01)
(52) U.S. Cl. ............................................. 380/269
(58) Field of Classification Search .................. 380/269
See application file for complete search history.

(56) References Cited

U.S. PATENT DOCUMENTS

| | | | |
|---|---|---|---|
| 5,990,810 A | 11/1999 | Williams | |
| 6,161,146 A | 12/2000 | Kley et al. | |
| 6,351,813 B1 | 2/2002 | Mooney et al. | |
| 6,851,056 B2 | 2/2005 | Evans et al. | |
| 6,993,661 B1 | 1/2006 | Garfinkel | |
| 7,237,013 B2 | 6/2007 | Winkeler et al. | |
| 7,266,842 B2 | 9/2007 | Foster et al. | |
| 7,289,643 B2 | 10/2007 | Brunk et al. | |
| 7,386,627 B1 * | 6/2008 | Lango et al. | 709/236 |
| 7,480,782 B2 * | 1/2009 | Garthwaite | 711/170 |
| 7,756,817 B2 * | 7/2010 | Merchia et al. | 1/1 |
| 2003/0037248 A1 | 2/2003 | Launchbury et al. | |
| 2003/0149852 A1 | 8/2003 | Kang | |
| 2003/0174861 A1 * | 9/2003 | Levy et al. | 382/100 |
| 2003/0200448 A1 | 10/2003 | Foster et al. | |
| 2004/0153642 A1 | 8/2004 | Plotkin et al. | |
| 2005/0033988 A1 | 2/2005 | Chandrashekhar et al. | |
| 2005/0041812 A1 | 2/2005 | Sundararajan et al. | |
| 2005/0080761 A1 | 4/2005 | Sundararajan et al. | |
| 2005/0102498 A1 | 5/2005 | Bojinov et al. | |
| 2005/0238175 A1 | 10/2005 | Plotkin et al. | |
| 2006/0036732 A1 | 2/2006 | Strohwig et al. | |
| 2007/0055891 A1 | 3/2007 | Plotkin | |
| 2007/0057048 A1 | 3/2007 | Plotkin | |
| 2007/0061432 A1 | 3/2007 | Plotkin | |
| 2007/0174362 A1 * | 7/2007 | Pham et al. | 707/204 |
| 2007/0174634 A1 | 7/2007 | Plotkin | |
| 2007/0255758 A1 | 11/2007 | Zheng et al. | |

(Continued)

OTHER PUBLICATIONS

Bilenko, Mikhail et al. "Adaptive Duplicate Using Learnable Strong Similarity Measures", Published in Proceedings of the Ninth ACM SIGKDD International Conference on Knowledge, Aug. 23, 2003, 10 pages.

(Continued)

*Primary Examiner* — Kambiz Zand
*Assistant Examiner* — Aubrey Wyszynski
(74) *Attorney, Agent, or Firm* — Cesari and McKenna, LLP

(57) ABSTRACT

Described is a process for encrypting and compressing data for storage by computing systems. A data stream received by a computing system is separated into data chunks for storage on a storage device using a data layout format. Each data chunk is examined and if possible, compressed to produce a compressed data chunk. Whether or not the data chunk can be compressed, the data chunk is encrypted and stored on the storage device in addition to metadata that describes the data chunk. When reading the stored data chunk from the storage device, the metadata identifies the starting location of the stored data chunk and provides metadata information to the computing system for decryption and decompression processing.

23 Claims, 8 Drawing Sheets

U.S. PATENT DOCUMENTS

2007/0294499 A1* 12/2007 Garthwaite .................. 711/170
2009/0012982 A1* 1/2009 Merchia et al. ............... 707/101
2010/0189424 A1* 7/2010 Doehla et al. ................. 386/124

OTHER PUBLICATIONS

Crochemore, Maxime et al., "Pattern Matching and Text Compression Algorithms", dated Jan. 8, 2003, retrieved from http://citeseer.comp.nus.edu.sg/595025.html, 50 pages.

Decru, Inc., "Decru Datafort Storage Security Appliances", 2004, 2 pages.

Decru, Inc., "Decru Data E-Series Storage Security Appliances—Transparent Data Security for Network Attached Storage (NAS)", 2004, 2 pages.

Decru, Inc., "Decru Datafort FC-Series Storage Security Applications—Comprehensive Security for Storage Area Networks and Tape Backup", 2004, 2 pages.

Network Applicance, Inc., Notification of Transmittal of The International Search Report and the Written Opinion of the International Searching Authority, or the Declaration, International Filing Date: Apr. 26, 2007, International Application No. PCT/US2007/010333, Mailed on Apr. 15, 2008, 15 pages.

Reichenberger, Christoph, "Delta Storage for Arbitrary Non-Text Files", published in Proceedings of the $3^{rd}$ International Workshop on Software Configuration Management, Jun. 12-14, 1991, pp. 144-152.

Hernandez, Mauricio A. et al. "Real-world Data is Dirty: Data Cleansing and the Merge/Purge Problem". Published in Data Mining and Knowledge Discovery, vol. 2, Jan. 1998, 48 pages.

Lee, Mong Li et al. "IntelliClean: a Knowledge-based Intelligent Data Cleaner", published by ACM International Conference on Knowledge Discovery and Data Mining, 2000, pp. 290-294.

* cited by examiner

ENCRYPTION AND COMPRESSION OF DATA FOR STORAGE

TECHNICAL FIELD

Embodiments of the present invention relate to data layouts of compressed and encrypted data stored on a storage system.

BACKGROUND

Data is typically stored by computing systems as plaintext or uncompressed data. However, uncompressed data occupies more storage space than compressed data. For example, a still image taken with a digital camera can be 10 Mega-Pixels (MP) in size. A group of such images stored as uncompressed data soon occupies all of the storage space available on storage media of the digital camera, such as a compact flash card. By compressing each still image, the compact flash card can store additional still images. For example, it may be possible to store 200 uncompressed still image data on the compact flash card. After compression, it may be possible to store almost double the amount of compressed still image data on the compact flash card.

Moreover, plaintext data stored by computing systems can be compromised. For example, data including credit card numbers may be stored as plaintext data on storage media, such as magnetic tapes. The magnetic tapes, which may be sent for archival storage offsite from a data operations center, may be lost or stolen. The credit card numbers on the lost or stolen magnetic tapes are then easily obtained because they were stored as plaintext data. Accordingly, a secure, yet space-saving process for storing data is needed.

SUMMARY

Embodiments of the present invention describe a process for encrypting and compressing data for storage by computing systems. A data stream received by a computing system is separated into data chunks for storage on a storage device using a particular data layout format. Each data chunk is examined and if possible, compressed to produce a compressed data chunk. Whether or not the data chunk can be compressed, the data chunk is encrypted and stored on the storage device in addition to metadata that describes the data chunk. When reading the stored data chunk from the storage device, the metadata identifies the starting location of the stored data chunk and provides metadata information to the computing system for decryption and decompression processing.

It will be obvious, however, to one skilled in the art, that embodiments of the present invention may be practiced without some or all of these specific details. In other instances, well known process operations have not been described in detail in order not to unnecessarily obscure the embodiments of the present invention described herein. Further, it should be appreciated that the present invention can be implemented in numerous ways, such as a process, an apparatus, a system, a device or a method on a computer readable medium. Several inventive embodiments of the present invention are described below.

DETAILED DESCRIPTION

The following description explains examples of a method and a system for encrypting and compressing data for storage by computing systems. Specifically, by compressing data, storage space can be efficiently used. Further, encrypted data can prevent unauthorized access to data. For example, a computing system, such as a storage system, tape library, virtual tape library, or the like, can receive a data stream from a source device, such as a client computer. The data stream is separated into data chunks for storage on a storage device using a data layout format. In this example, a storage system can manage the storage device. Each data chunk is examined and if possible, each data chunk is compressed to produce a compressed data chunk. Whether or not the data chunk can be compressed, the data chunk is encrypted and stored on the storage device. In addition, metadata that describes the data chunk is stored on the storage device along with the encrypted data chunk.

When reading the encrypted data chunk from the storage device, the metadata identifies the starting location of the previously stored, encrypted data chunk. The metadata also includes information for decryption and decompression processing. It will be obvious, however, to one skilled in the art, that embodiments of the present invention may be practiced without some or all of these specific details. In other instances, well known process operations have not been described in detail in order not to unnecessarily obscure the embodiments of the present invention described herein.

Figure 1:
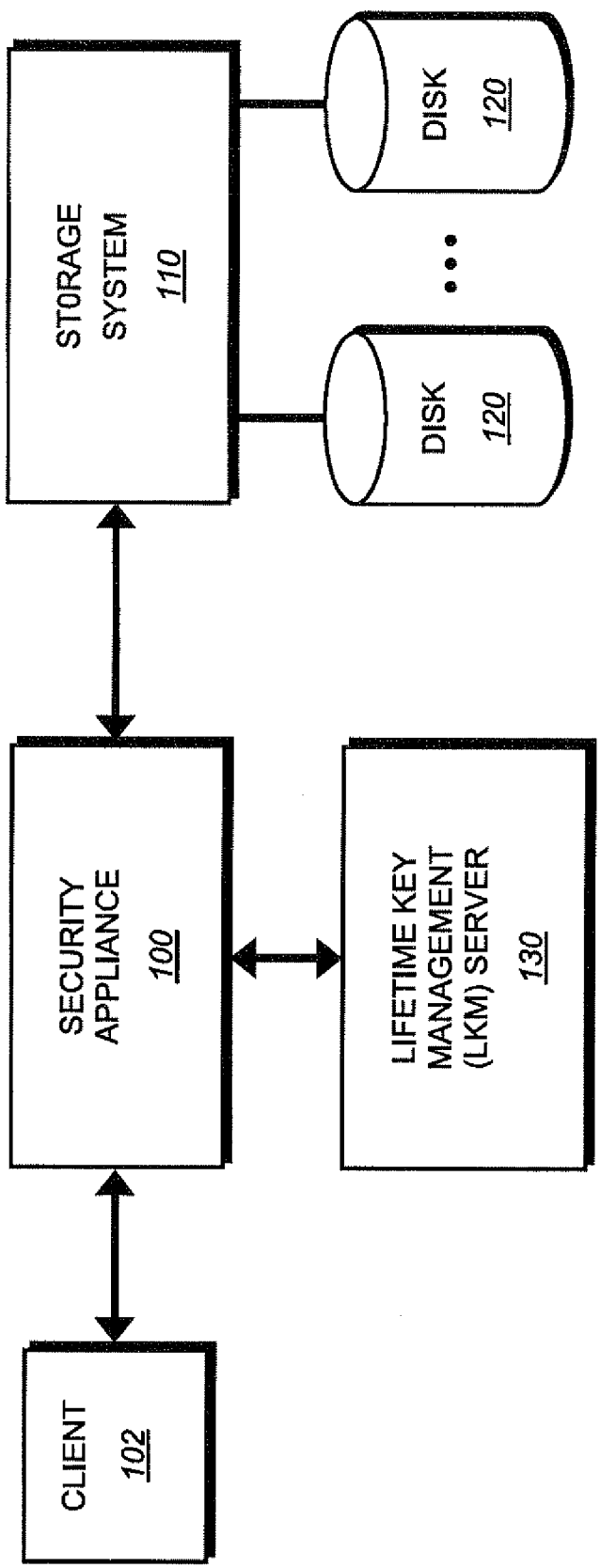
FIG. 1 is a block diagram illustrating an environment including a multi-protocol security appliance, in accordance with an embodiment of the invention.

FIG. 1 is a block diagram illustrating an environment including a multi-protocol security appliance, in accordance with an embodiment of the invention. For example, the security appliance 100 is coupled between one or more clients 102 and one or more storage systems 110, such as an application server. Specifically, in certain embodiments of the present invention, a data stream can originate at a client 102, which transmits the data stream to the security appliance 100. In FIG. 1, the security appliance 100 is capable of compressing and encrypting data for storage on the storage system 110. However, it should be appreciated that in other embodiments of the present invention, the security appliance 100 can be incorporated in the storage system 110, such as later described with respect to FIG. 2, thus allowing the storage system 110 to compress/decompress and encrypt/decrypt data. It yet other embodiments (not shown), the security appliance 100 may also be incorporated in a network device that routes data throughout a network, which may also with have the capability to provide storage services similar to the storage system 110. Accordingly, FIG. 1 should be understood to illustrate an example of an embodiment of the present invention.

The security appliance 100, which is configured to act as an encryption proxy, intercepts a data access request issued by the client 102 for receipt by the storage system 110. The data access request may be a read request to retrieve certain data stored on storage devices, such as disks 120 or other media, coupled to the storage system 110. Alternatively, the data access request may be a write request to store data on the storage device. In the case of a write request, the security appliance 100 intercepts the request, attempts to compress the data, encrypts the data associated with the request, and forwards the encrypted data to the storage system 110 for storage at a specified location (address) on disk 120. In the case of a read request, the security appliance 100 intercepts the request and forwards it onto the storage system 110, which returns the requested data to the security appliance 100 in encrypted form. The security appliance 100 then decrypts the encrypted data, possibly decompresses the data, and returns the decrypted/decompressed data to the client 102.

In the illustrative embodiment, the security appliance 100 employs an encryption algorithm, e.g., the Advanced Encryption Standard (AES) or other appropriate algorithms. The execution of the algorithm transforms unencrypted data (cleartext) generated by the clients 102 into encrypted data (ciphertext) intended for secure storage, i.e., one or more cryptainers, on the storage system 110. To that end, the security appliance 100 illustratively uses a high-quality, software or hardware-based pseudo random number generation technique to generate encryption keys. The encryption and decryption operations are performed using these encryption keys, such as a cryptainer key associated with each cryptainer. As described herein, the security appliance 100 uses an appropriate cryptainer key to encrypt or decrypt portions of data stored in a particular cryptainer. In addition to performing encryption and decryption operations, the security appliance 100 also performs access control, authentication, virtualization, secure-logging operations, and can perform compression and decompression operations, e.g. Lempel-Ziv-Welsh (LZW) and its variants, Huffman coding, or the like.

A lifetime key management (LKM) server 130, or similar key management system, is configured to manage encryption keys used by the security appliance 100 to encrypt and decrypt data securely stored on the storage system 110, ensuring encryption key availability for the life of the secured data. For example, the LKM server 130 receives encrypted cryptainer keys from the security appliance 100 and sends encrypted cryptainer keys on demand to the security appliance 100. The LKM server 130 is further configured to support a plurality of security appliances 100 such that, when a particular appliance encounters a data access request directed to a cryptainer for which it does not have the appropriate key, that appliance accesses the LKM server 130 to receive the appropriate key. Further, it should be appreciated that the LKM server 130 can be implemented on a personal computer, server-class computer, blade-type computing device, portable computing device or other computing device.

Figure 2:
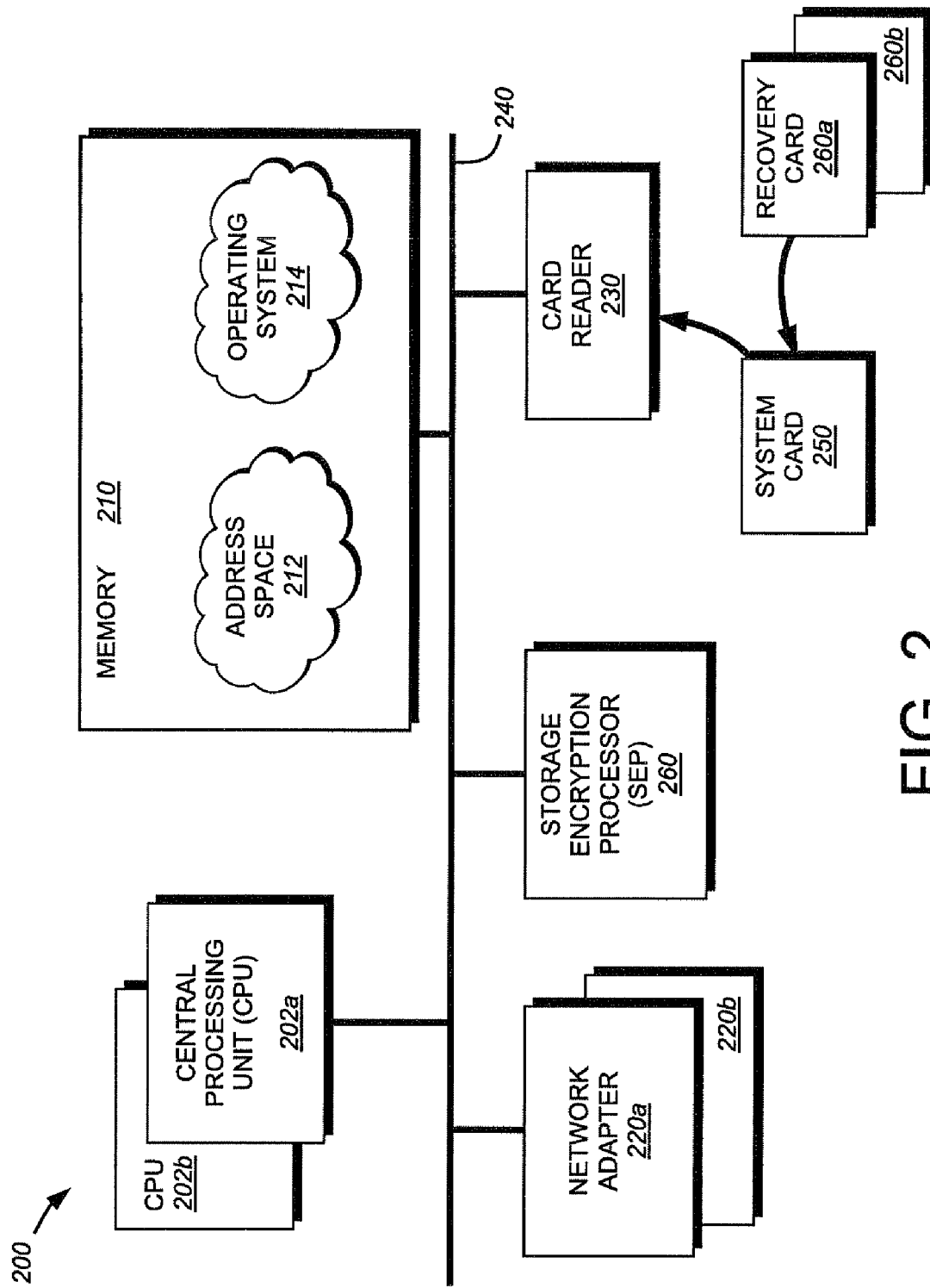
FIG. 2 is a block diagram illustrating the multi-protocol security appliance, in accordance with an embodiment of the invention.

FIG. 2 is a block diagram illustrating the multi-protocol security appliance 200, in accordance with an embodiment of the invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a multi-core storage encryption processor (SEP) 260 and a card reader 230 interconnected by a system bus 240, such as a conventional Peripheral Component Interconnect (PCI) bus. The SEP 260 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The SEP 260 includes a (smart card) microcontroller (not shown) that comprises crypto engines configured to perform, inter alia, key management using an internal program code base with a field programmable gate array FPGA (not shown). It should be appreciated that an FPGA is purely illustrative. For example, the logic implemented by the FPGA may be embodied in an Application Specific Integrated Circuit (ASIC), or the like. The microcontroller communicates with logic circuitry embodied as the FPGA configured to perform encryption and decryption operations for the SEP. Further, the FPGA can be configured to include multiple processing cores (not shown) such an encryption core, a decryption core, a compression core, and a decompression core.

Further, the FPGA includes an input/output (I/O) unit (not shown) coupled to at least one key unit (not shown) that contains state models used by the SEP 260 to process keys for encryption/decryption. For example, the microcontroller transmits keys to the FPGA. Thereafter, the FPGA initiates DMA operations over the system bus 240 to retrieve data stored in memory 210 and provide that data to at least one key unit for encryption/decryption. The FPGA then initiates DMA operations to return the data (with descriptor handling) over the bus 240. It should be appreciated that a key unit per encryption core 310 and decryption core 320 are included in exemplary embodiments of the present invention. In yet other embodiments, a single key unit may be used to globally implement state models for encryption/decryption.

Since the SEP 260 protects encryption keys from being "touched" (processed) by the system software executing on the CPU 202, a mechanism is needed to load keys into and retrieve keys from the SEP. To that end, the card reader 230 provides an interface between a "smart" system card 250 and the SEP 260 for purposes of exchanging encryption keys. Illustratively, the system card is a FIPS 140-2 level-3 certified card that is configured with customized software code. The security appliance (and card reader 230) are further configured to support additional smart cards referred to as recovery cards 260a,b. The security appliance illustratively supports up to 40 recovery cards with a default value of, e.g., 5 recovery cards, although any number of cards can be supported based on the particular security policy.

Operationally, encryption keys are exchanged between the SEP 260 and system card 250, where they are "secret shared" (cryptographically assigned) to the recovery cards 260 as recovery keys, as described herein. These recovery keys can thereafter be applied (via the recovery cards) to the security appliance 200 and/or LKM 120 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys.

In the illustrative embodiment, the threshold scheme of the recovery cards 260 is configured to split recovery policy keys that are based on various policies for recovery. For example, policy recovery keys may be split in a 2 out of 5 mechanism, whereby two policy keys are needed to encrypt domain keys which, in turn, encrypt the cryptainer keys. Therefore, a hierarchy of encryption keys is provided that generates a plurality (e.g., thousands) of cryptainer keys without the need for as many recovery policy keys ("secret shares"). Note that the secret shares are not stored as such on the recovery cards, but rather are encrypted with a key that is assigned to each of the recovery cards. Therefore, the secret shares are "cryptographically assigned" to the recovery cards 260.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. For example, data may be stored in the memory 210 during read and write operations. The data, stored as blocks may be, for example, in groups of 64 Kbytes. However, it should be appreciated that the block can be of any size that is adaptable for storage in the memory 210.

The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

The operating system 212 illustratively organizes the memory 210 into an address space arrangement available to the software processes and modules executing on the processors. In the illustrative embodiment, the operating system software is a customized version of a Unix-type operating system, although other operating systems may be used. Notably, the security appliance 200 "virtualizes" storage such that, to a client 102, the appliance appears as a storage system 110 whereas, from the perspective of the storage system, the security appliance appears as a client. Such virtualization requires that the security appliance manipulate network (e.g. IP or the like) addresses with respect to data access requests and responses. For example, the security appliance 200 manipulates (changes) the source and destination IP addresses of the data access requests and responses.

Figure 3:
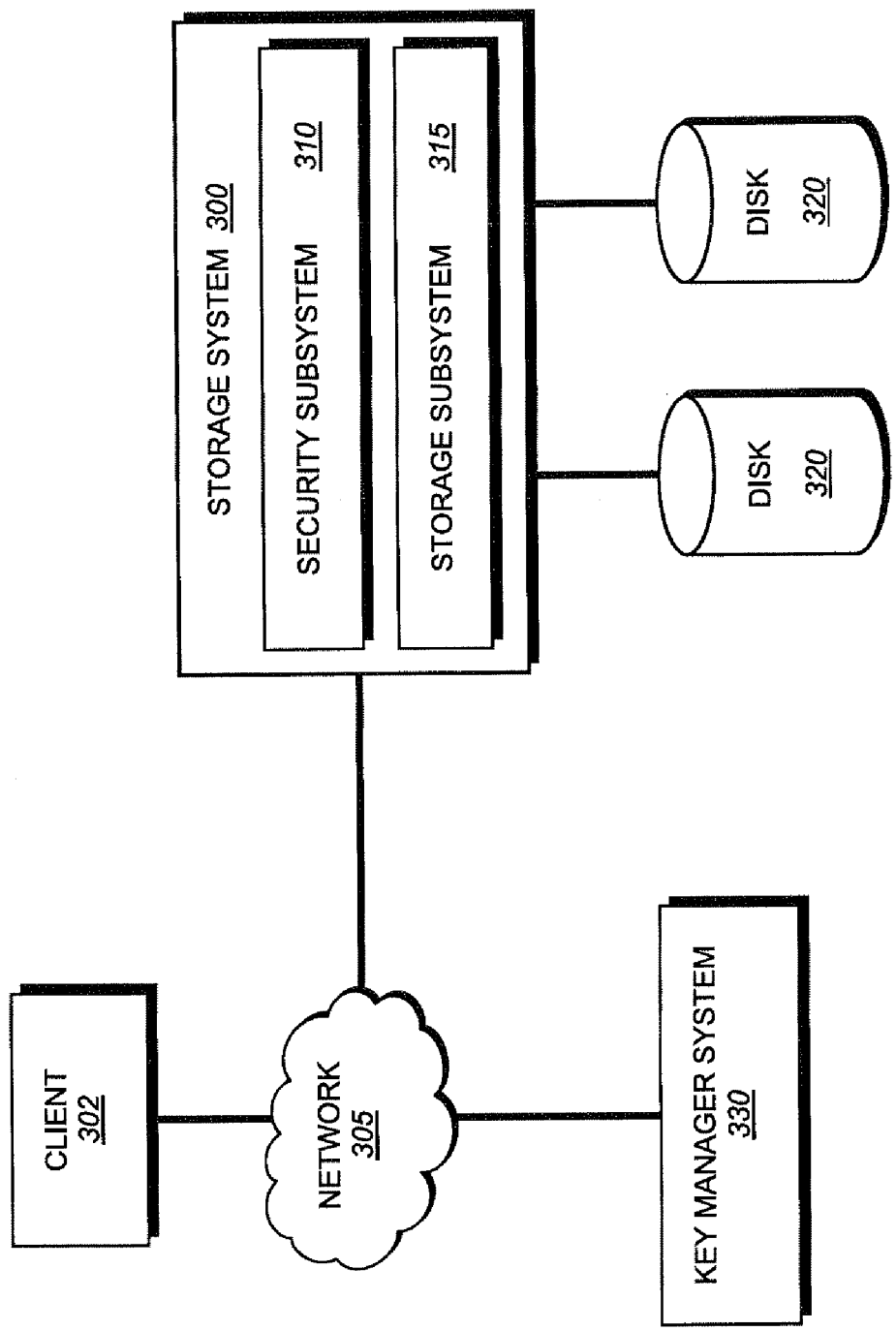
FIG. 3 is a block diagram illustrating a security subsystem of a storage system, in accordance with an embodiment of the invention.

FIG. 3 is a block diagram illustrating a security subsystem 310 of a storage system 300, in accordance with an embodiment of the invention. Specifically, a client 302 can generate the data stream to the storage system 300, which performs a data access request, such as a read or write operation. An intermediary module, such as the security subsystem 310, performs encryption/decryption and compression/decompression operations on data portions of the data stream. Further, the security subsystem 310, in conjunction with the storage subsystem 315, which may include a Redundant Array of Independent Disks (RAID) system, processes the data portions for writing to/reading from the disks 320. Specifically, these data portions, or data chunks, can individually be compressed and encrypted during a write operation. Conversely, the data chunks can be individually decrypted and decompressed during a read operation.

It should be appreciated that the implementation of security subsystem 310 can vary in different embodiments of the present invention. For example, in one embodiment, the security subsystem 310 may be implemented as a software module managed by an operating system of the storage system 300. An illustrative operating system may be Data ONTAP®, which is available from Network Appliance, Inc. of Sunnyvale, Calif. It should be appreciated that any operating system, such as Linux, Microsoft Windows, or the like, can be adapted to perform storage system services. Thus, the embodiments of the present invention are not limited to any particular operating system, as long as the security subsystem 310 is used in connection with the operating system to provide encryption/decryption services.

In another embodiment, the security subsystem 310 can be implemented as hardware in communication with the storage system 315. For example, a computer card enabling the security subsystem 310 can be connected to a communication slot of the storage system 300 motherboard, such as a Peripheral Component Interconnect (PCI) slot or the like. On the computer card can be an encryption processor and other programmable processors, such as FPGAs and ASICs, as described with respect to FIG. 2. In another illustrative embodiment, the security subsystem 310 may be implemented in both hardware and software, as described above.

In embodiments of the present invention, the storage system 300 including the security subsystem 310 may be deployed within a storage area network (SAN) or a network attached storage (NAS) environment. When used within a NAS environment, the storage system 300 may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The storage system 300, illustratively embodied as a file server, or filer, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a communication network comprising a geographically distributed collection of interconnected communication links, such as Ethernet, that allow clients 302 to remotely access the information (files) on the storage system 300. The clients 302 typically communicate with the storage system 300 by exchanging discrete frames or packets of data according to pre-defined protocols, such as the Transmission Control Protocol/Internet Protocol (TCP/IP).

In the client/server model, the client 302 may comprise an application executing on a computer that "connects" to the storage system 300 over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the storage system may be enhanced for networking clients.

A SAN is a high-speed network that enables establishment of direct connections between a storage system 300 and its storage devices, such as disks 320. The SAN may thus be viewed as an extension to a storage bus and, as such, an operating system of the storage system enables access to stored data using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients 302 operating in a SAN environment are "initiators" that initiate commands and requests to access data. The storage system 300 is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement, or deployment, allows decoupling of storage from the storage system 300, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

Further, a network environment may be provided wherein information (data) is stored in secure storage served by one or more storage systems including the security subsystem 310. Each security subsystem 310 is configured to transform unencrypted data (cleartext) generated by clients (or initiators) 302 into encrypted data (ciphertext) destined for secure storage or "cryptainers" on the storage system (or target) 300. As used herein, a cryptainer is a piece of secure storage on a storage device, such as a disk 320, in which the encrypted data is stored. In the context of a SAN environment, a cryptainer can be, e.g., a disk, a region on the disk or several regions on one or more disks 320 that, in the context of a SAN protocol, is accessible as a lun. In the context of a NAS environment, the cryptainer may be a collection of files on one or more disks 320. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. Illustratively, encryption keys are managed by a key manager system 330. An encryption key is a code or number which, when taken together with an encryption algorithm, defines a unique transformation used to encrypt or decrypt data. Data remains encrypted while stored in a cryptainer until requested by an authorized client 302. At that time, the security subsystem 310 retrieves the encrypted data from the cryptainer, decrypts it and forwards the unencrypted data to the client 302.

Figure 4:
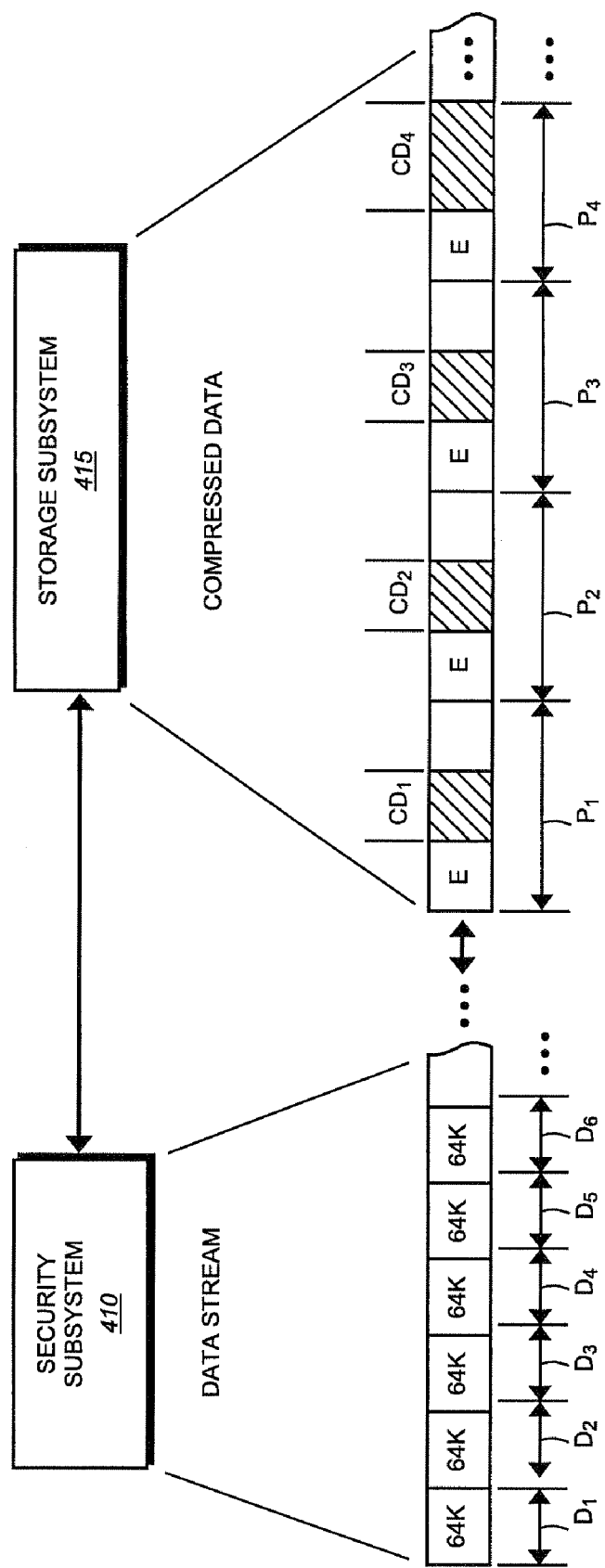
FIG. 4 is an illustration depicting the writing of data chunks of a data stream to a storage device, in accordance with an embodiment of the invention.

Accordingly, in an exemplary embodiment of the present invention, the client 302 transmits the data stream through a communication system 305, such as a FC network, iSCSI network, or the like, to perform data access requests on the storage devices accessible from the storage system 300. Upon receiving the data stream from the client 302, the storage system 300 and the key manager 330 process data chunks for data access requests. For example, FIG. 4 is an illustration depicting the writing of data chunks of a data stream to a storage device, in accordance with an embodiment of the invention. A data stream received by a security subsystem 410 can be apportioned into chunks of 64K blocks. It should be appreciated that a 64K block size is an arbitrary block size and in other embodiments, the data stream can be partitioned into different sized data chunks. Further, in other embodiments of the present invention, each block size can vary, thus producing a variable-sized block.

In the illustrative embodiment of a particular data layout format, each of the data chunks, such as $D_1$, $D_2$, $D_3$, etc. are compressed, and then encrypted to produce a compressed data chunk ($CD_1$, $CD_2$, $CD_3$, etc.). Then, a header, or metadata ($\epsilon$), along with the compressed data chunk, are both written atomically (i.e. both the metadata and the compressed data chunk are not interrupted during a write operation) to a storage device by a storage subsystem 415. The metadata, which can comprise e.g. a 256-bit block or other appropriate size, can illustratively identify whether the data chunk is compressed or uncompressed, whether the data chunk is encrypted or unencrypted, what type of compression was used, what type of file is associated with the data chunk, and a cryptographic signature to determine whether or not the data chunk is authentic. In some embodiments of the present invention, this can be accomplished by establishing reserved sections of the data block, wherein a section can identify, e.g. whether the data chunk is compressed or uncompressed.

Each metadata/compressed data pairing is stored with an offset from one another such that a gap between pairs can result when the data chunks are compressed. For example, if the uncompressed data chunk, $D_1$, is 64K (in other embodiments, the uncompressed data chunk may have a different size), then after compression and encryption, the compressed data chunk, $CD_1$, can occupy 4K. In addition, the compressed data chunk of 4K and its metadata, $\epsilon$, are stored within a 64K+$\epsilon$ offset, $P_1$, (i.e. 64K+$\epsilon$) of the storage device. If the data chunk is uncompressed, then the full 64K data chunk and the metadata occupy the offset. As each metadata/compressed data pair is written to an offset, any unused space in the offset is left empty. In practice, the unused space can be identified within the metadata, thus not actually occupying any space on the storage device. It should be appreciated that although the metadata is illustrated in FIG. 3 as a header prepended to the compressed data chunk, the metadata can also be appended to the data chunk. Further, although an embodiment of the invention is described by using an offset of (64K+$\epsilon$), in other embodiments, the offset can be (64K−$\epsilon$), where the amount of space used for the metadata is accounted for within the illustrative 64K data block.

If a data block has been written previously to the storage device and an update to the data block is needed, then the compressed data block is read, decrypted, decompressed, written-over, re-compressed, re-encrypted, and stored (e.g. read/modify/write operation). It should be appreciated that in other embodiments of the present invention, the previously written data may not be written over, such as with a write-out-of-place file system. Further, metadata/compressed data blocks can be aggregated in NVRAM, battery-backed memory, flash memory, or the like, and then written in stages to avoid multiple write operations to the storage device, such as with consistency points, used by Network Appliance products.

When reading the compressed data chunks from the storage device as illustrated in FIG. 4, the size of each offset is known. Thus, by calculating the location (or address) of the beginning of each metadata/compressed data chunk pair, each pair may be read by the storage subsystem 415 and thereafter presented to the security subsystem 410. When reading a metadata/compressed data chunk pair as described above, the read operation can perform in a predictable time period for non-instant file retrieval. For example, word-processed documents, non-image files, non-music files and the like, are read in a predictable time pattern because each offset is a fixed size and there is no extra time spent searching for compressed data blocks on the storage device.

Upon receiving a metadata/compressed data pair, the security subsystem 410 examines the metadata to determine whether the data chunk is compressed, what type of compression is used, etc. Compressed data is decompressed after a decryption operation. Otherwise, if the data was not compressed, then the decrypted data block is aggregated with other data blocks for transmission to the client that initiated the data access request. It should be appreciated that the data chunk $D_3$ may not have been compressible because, e.g., there were no repetitious sequences of a data block to compress.

Figure 5:
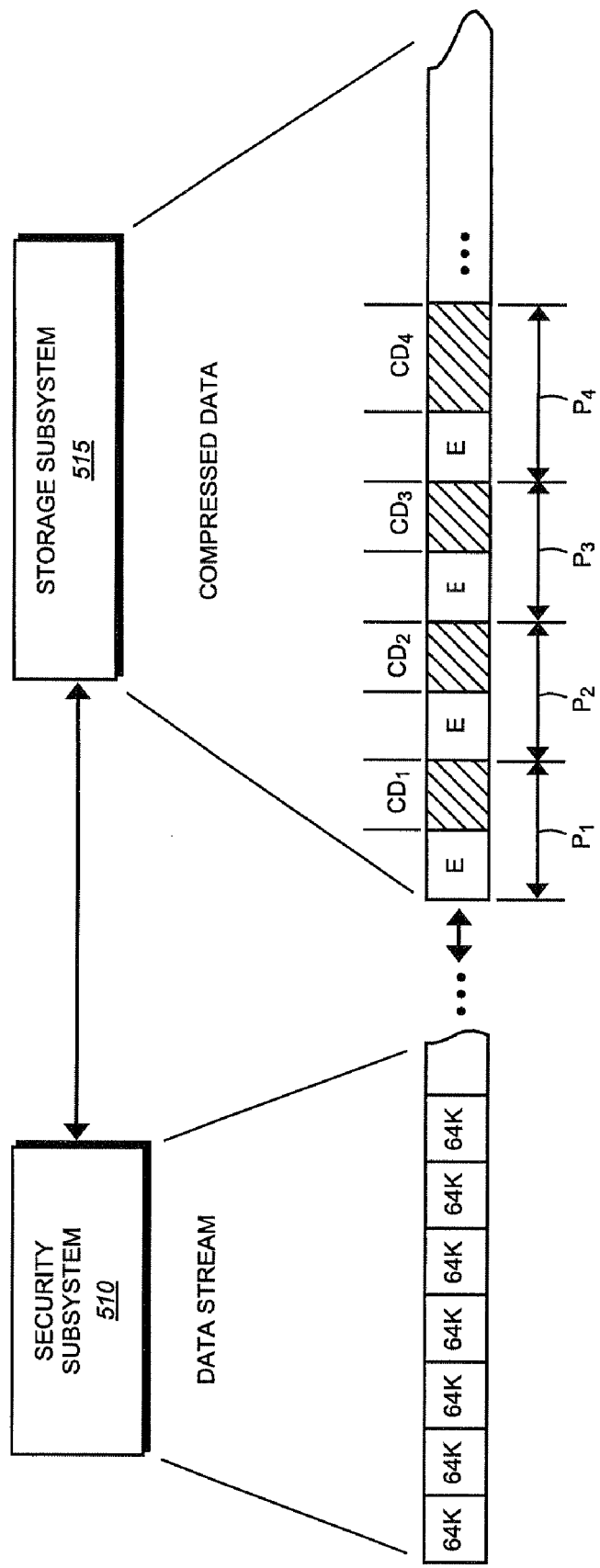
FIG. 5 is another illustration depicting the writing of data chunks of a data stream to a storage device, in accordance with an embodiment of the invention.

In another embodiment of the present invention, FIG. 5 is another illustration depicting the writing of data chunks of a data stream to a storage device using another data layout format. For example, instead of using a fixed-size offset to store the metadata/compressed data chunk, there are no gaps. Accordingly, in the illustration of FIG. 5, suppose, for example, the security subsystem 510 compresses $CD_1$ down to 40% of its original size. Immediately after writing $CD_1$ on the storage device, the storage subsystem 515 writes $CD_2$, which the security subsystem 515 compressed down to 25% of its original size. By storing each metadata/compressed data chunk pair immediately next to each other without gaps, it is more difficult to read the compressed data blocks by looking for fixed-size offsets. However, by adding a marker in the metadata, $\epsilon$, it is possible to perform binary searches of the data. Thus, by using a binary search, in the worst case, the time to perform the search is O(log N). For example, when a million metadata/compressed data chunk pairs have been stored, in the worst case, the search-for compressed data chunk can be discovered in 20 comparisons. In contrast, a sequential search of the same million pairs requires 500,000 comparisons to find the search-for compressed data chunk. One of ordinary skill will appreciate that such a binary search may require occasional sorts to order the metadata/compressed data chunk pairs. Thus, it should be appreciated that other search mechanisms are possible as long as metadata and compresses data chunks are stored in pairs on the storage device. By using the methodology described with respect to FIG. 5, virtual tape devices that originally store metadata/compressed data chunks in an ordered fashion can be quickly searched.

Figure 6:
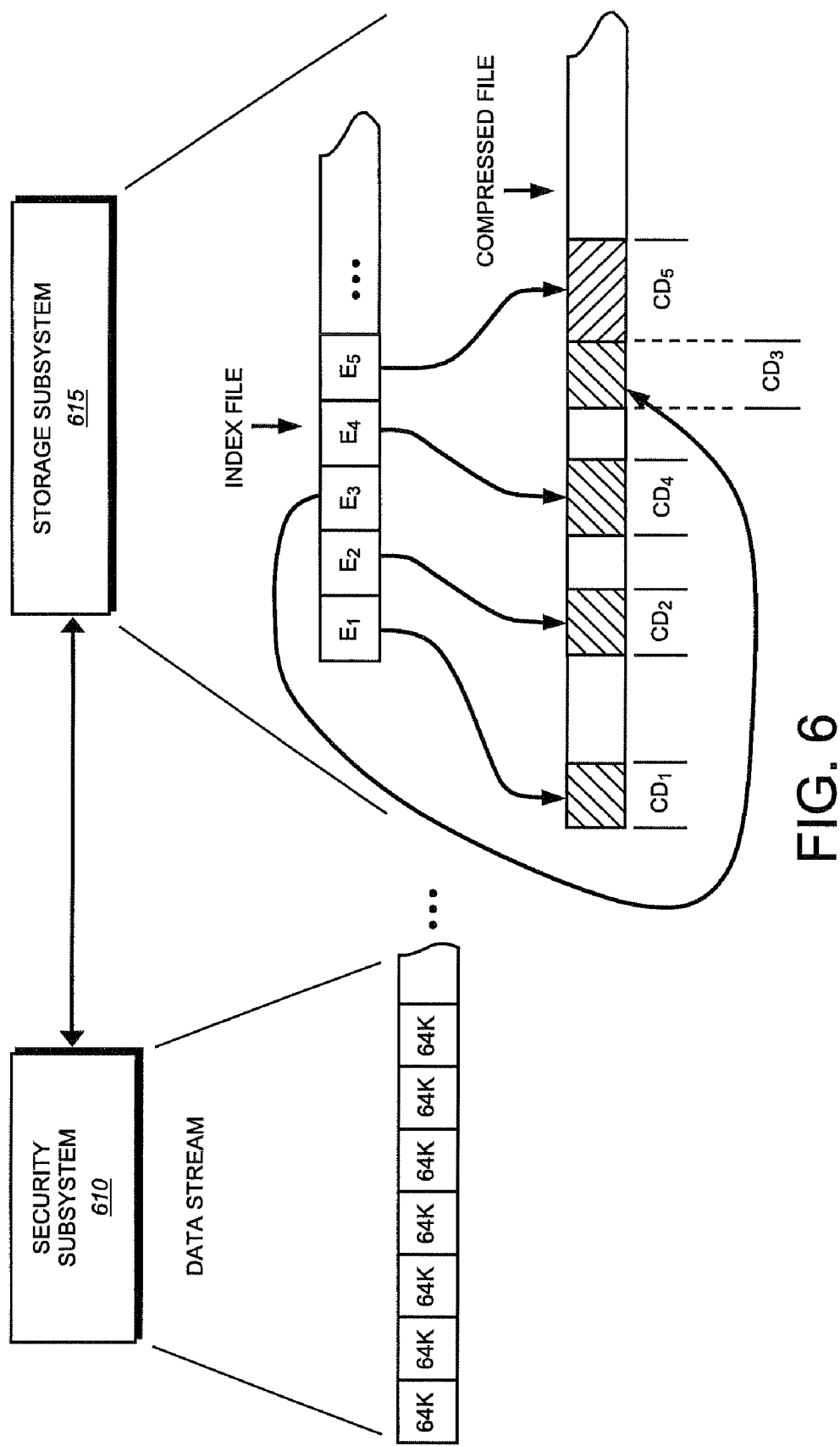
FIG. 6 is an yet another illustration depicting the writing of data chunks of a data stream to a storage device, in accordance with an embodiment of the invention.

FIG. 6 is another illustration depicting the writing of data chunks of a data stream to a storage device according to yet another data layout format, in accordance with an embodiment of the invention. For example, instead of writing metadata/compressed data chunk pairs on the storage device, the metadata is written to an index file of the storage device. The metadata include pointers to the locations of corresponding compressed data chunks, which can be of variable size. As shown in FIG. 6, $\epsilon_3$ points to $CD_3$ and $\epsilon_4$ points to $CD_4$. This method is similar to a hashing technique, thus avoiding the need to consider sorted metadata, such as the method described with respect to FIG. 5.

When performing an update to previously written data, in contrast to the write-in-place or write-out-of-place methods described above, an alternative is to read the metadata and compressed data chunk (such as with respect to FIGS. 5 and 6) and mark the storage device locations as "empty," thus producing gaps. The empty marker can be a reserved value that replaces the metadata, indicating that the location of the updated compressed data chunk is located elsewhere, such as the end of sequence of compressed data chunks. For example, with respect to FIG. 6, $\epsilon_2$ points to $CD_2$, which can be read and marked with the reserved value indicating a gap between $CD_1$ and $CD_3$. $CD_3$ is updated and written as $\epsilon_5$ pointing to $CD_5$. After a period of time where the gaps are numerous, a background process of the operating system can aggregate the compressed data chunks to remove the gaps.

Figure 7:
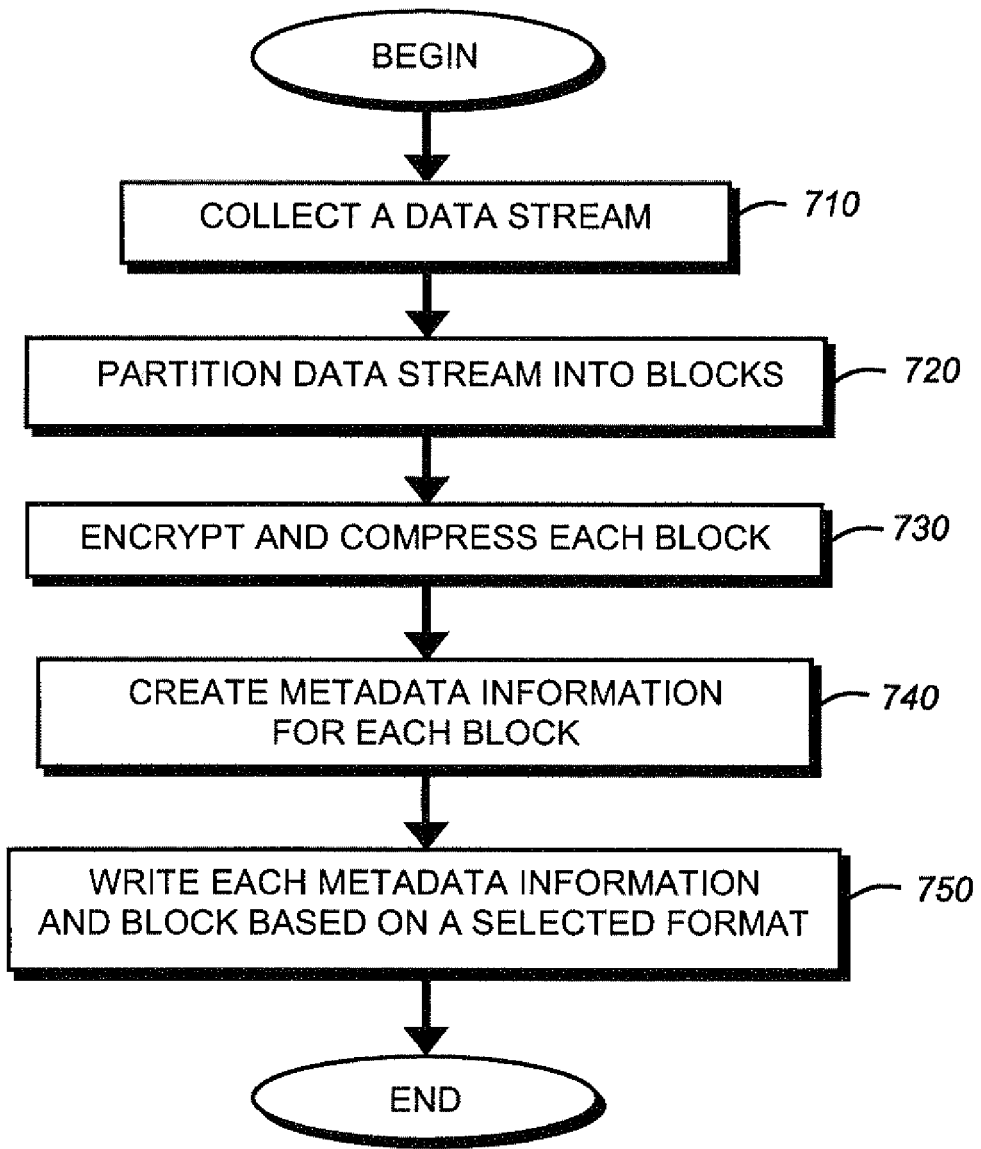
FIG. 7 is a flowchart diagram of operations for storing data blocks on a storage device, in accordance with an embodiment of the invention.

FIG. 7 is a flowchart diagram of operations for storing data blocks on a storage device, in accordance with an embodiment of the invention. Illustratively, the operations begin when a client computer or other device, transmits a data stream to a security appliance or a storage system including a security subsystem. For this example, assume the security subsystem receives the data stream. In operation 710, the storage system collects the data stream, perhaps in a buffer embodied as NVRAM, or other non-volatile memory device. The data stream is then partitioned into blocks, in operation 720. The partitioned blocks, for example, can be 64K each. Thereafter, in operation 730, the security subsystem compresses each block. If the block can be compressed by using an appropriate compression algorithm, such as LZW, then the compressed data block is encrypted. If the block is not capable of being compressed by the security subsystem because, e.g., the appropriate compression algorithm is not available, then the block is encrypted. Then, in operation 740, the security subsystem creates the metadata information for each data block that has now been possible compressed and encrypted. Such metadata information may include information to identify whether the data block is compressed or uncompressed, whether the data block is encrypted or unencrypted, what type of compression was used, what type of file is associated with the data block, and a cryptographic signature to determine whether or not the data block is authentic. Thereafter, in operation 750, the storage system writes each metadata information and the corresponding encrypted data block to the storage device based on a selected format. Such a selected format can be selected by a user having administrative privileges to the storage system, e.g. during the initial setup of the storage system. Further, the various formats for selection include the processes described with respect to FIG.

4 through FIG. 6. After the storage system writes the metadata information and encrypted data to the storage device, the operations end.

Figure 8:
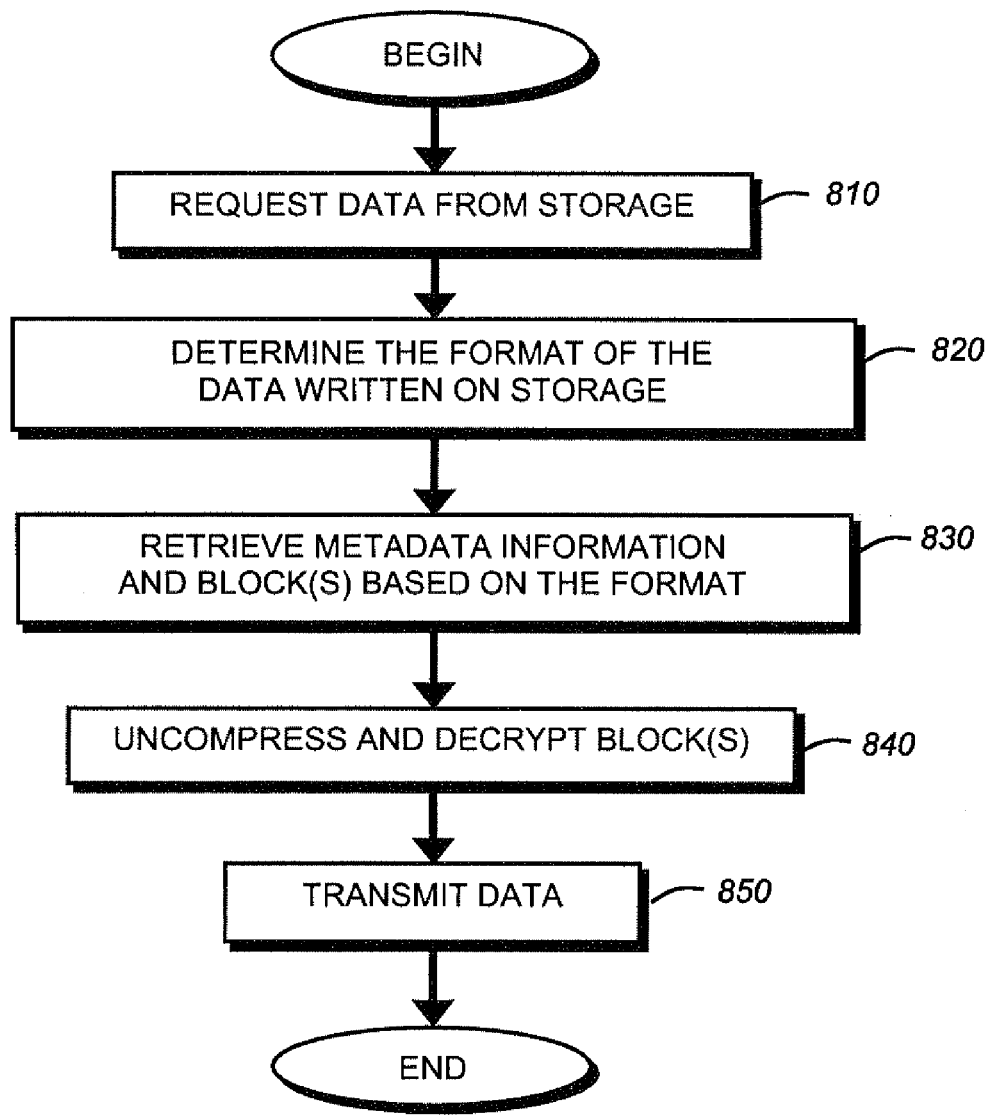
FIG. 8 is a flowchart diagram of operations for reading data blocks from a storage device, in accordance with an embodiment of the invention.

FIG. 8 is a flowchart diagram of operations for reading data blocks from a storage device, in accordance with an embodiment of the invention. For example, if a client performs a data access request, such as a read operation, the process begins by the client requesting data from the storage system, as illustrated by operation 810. Upon receipt of the data access request, in operation 820, the storage system determines the data layout format of the data written on the storage device. Specifically, an operating system of the storage system identifies the format used when writing data to the storage device, such as the data layout formats described with respect to FIGS. 4 through 6. Illustratively, the data layout format may be identified in the inodes stored in the memory of the storage system, a header of the data access request, a cryptainer flag, or other file system data structure.

Thereafter, in operation 830, the storage subsystem of the storage subsystem retrieves metadata information and the compressed data blocks by using the identified data layout format. Upon receiving the metadata and compressed data block pair, the security subsystem decrypts and decompresses the data block by examining the metadata information in operation 840. For example, the metadata information can indicate from a reserved section of the metadata that the decompression algorithm used should be LZW. In operation 850, before ending the process to read data blocks, the storage system collects the uncompressed and decrypted data blocks from the storage device and transmits the data to the client that initiated the data access request.

It should be appreciated that the illustrative embodiments of the present invention described above can be practiced with any type of software application. Further, the operations and process described above are purely exemplary and imply no particular order. For example, the operations may be used in a modified sequence or may be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Moreover, any of the operations described above that form part of the invention are useful machine operations that may be implemented by a machine. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings previously described, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), Storage Area Network (SAN), read-only memory, random-access memory, CD-ROMs, CD-Rs, CD-RWs, magnetic tapes and other optical and non-optical data storage devices. Further, the computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for writing a data stream to a storage device serviced by a computer, comprising:
    receiving at a memory of the computer the data stream and partitioning the data stream into a plurality of data chunks;
    compressing one or more of the plurality of data chunks;
    encrypting one or more of the plurality of data chunks;
    creating, by a security subsystem, metadata for each data chunk of the plurality of data chunks, wherein the metadata identifies whether the data chunk is compressed or uncompressed, whether the data chunk is encrypted or unencrypted, a type of compression used if the data chunk is compressed, a type of file information associated with the data chunk, and a cryptographic signature to determine whether the data chunk is authentic;
    storing each of the plurality of data chunks with the metadata on the storage device using a data layout format; and
    determining a starting location of a first data chunk stored on the storage device by examining first metadata stored with the first data chunk on the storage device.

2. The computer-implemented method of claim 1, wherein the security subsystem performs one of encrypting, decrypting, compressing, and decompressing the first data chunk.

3. The computer-implemented method of claim 2, wherein the metadata comprises compression information that includes a maximum size of the first data chunk.

4. The computer-implemented method of claim 1, wherein the type of file information comprises an identifier for at least one of an audio-video file, a still-image file, and an audio file.

5. The computer-implemented method of claim 1, wherein one or more of the plurality of data chunks stored on the storage device are not compressed.

6. The computing-implemented method of claim 1, further comprising:
    receiving a data access request for the first data chunk; and
    identifying the data layout format by the computer system in response to receiving the data access request.

7. The computer-implemented method of claim 6, wherein the data layout format comprises a first metadata and data chunk pair of the data stream with a gap between a second metadata and data chunk pair of the data stream.

8. The computer-implemented method of claim 6, wherein the data layout format comprises a first metadata and data chunk pair of the data stream without a gap between a second metadata and data chunk pair of the data stream.

9. The computer-implemented method of claim 6, wherein the data layout format comprises a metadata file indexing the metadata.

10. The computer-implemented method of claim 1, wherein the data layout format is selected from one of fixed-size offset, a gap pair, a non-gap pair, and an index format.

11. A computer system configured to write data to a storage device of the computer system, comprising:
    a processor;

a compression module configured to compresses a data chunk of a data stream received at a memory of the computer system;

an encryption module configured to encrypt the compressed data chunk;

an operating system executed by the processor and configured to, create metadata for each data chunk of the plurality of data chunks, wherein the metadata identifies whether the data chunk is compressed or uncompressed, whether the data chunk is encrypted or unencrypted, a type of compression used if the data chunk is compressed, a type of file information associated with the data chunk, and a cryptographic signature to determine whether the data chunk is authentic, store each of the plurality of data chunks with the metadata on the storage device using a data layout format, and the operating system further configured to examine first metadata stored with a first data chunk on the storage device to determine a starting location of the first data chunk stored on the storage device.

12. The computer system of claim 11, wherein the compression module is further configured to initiate a compression algorithm based on the type of file information.

13. The computer system of claim 12, wherein the type of file information comprises an identifier for at least one of a video type, an audio type, an image type, and a document type.

14. The computer system of claim 11, wherein the operating system is further configured to process a data access request for the first data chunk, wherein the operating system is further configured to identify the data layout format in response to processing the data access request.

15. The computer system of claim 11, wherein the data layout format comprises a first metadata and data chunk pair of the data stream with a gap between a second metadata and data chunk pair of the data stream.

16. The computer system of claim 11, wherein the data layout format comprises a first metadata and data chunk pair of the data stream without a gap between a second metadata and data chunk pair of the data stream.

17. The computer system of claim 11, wherein the data layout format comprises a metadata file indexing the metadata.

18. The computer system of claim 11, wherein the metadata comprises compression information.

19. The computer system of claim 18, wherein the compression information comprises a maximum size of the data chunk.

20. The computer system of claim 11, wherein the data layout format is identified by the computer system in response to a received data access request for the data chunk.

21. The computer system of claim 11, wherein the operating system is executed by a security appliance.

22. The computer system of claim 11, wherein at least one data chunk of the plurality of data chunks is not compressed.

23. A non-transitory computer-readable storage medium stored with executable program instructions for execution by a processor, comprising:

program instructions that partition a received a data stream at a memory into a plurality of data chunks;

program instructions that compress one or more of the plurality of data chunks;

program instructions that encrypt one or more of the plurality of data chunks;

program instructions that create metadata for each data chunk of the plurality of data chunks, wherein the metadata identifies whether the data chunk is compressed or uncompressed, whether the data chunk is encrypted or unencrypted, a type of compression used if the data chunk is compressed, a type of file information associated with the data chunk, and a cryptographic signature to determine whether the data chunk is authentic;

program instructions that store each of the plurality of data chunks with the metadata on a storage device using a data layout format; and program instructions that determine a starting location of a first data chunk stored on the storage device by examining first metadata stored with the first data chunk on the storage device.

* * * * *